United States Patent [19]

Nafziger et al.

[11] 4,053,302

[45] Oct. 11, 1977

[54] SYNTHETIC FLUORSPAR FOR CONDITIONING ELECTRIC FURNACE SLAGS

[75] Inventors: Ralph H. Nafziger; Henry E. Blake, Jr., both of Albany, Oreg.

[73] Assignee: The United States of America as represented by the Secretary of the Interior, Washington, D.C.

[21] Appl. No.: 776,697

[22] Filed: Mar. 11, 1977

Related U.S. Application Data

[63] Continuation of Ser. No. 729,750, Oct. 5, 1976, abandoned.

[51] Int. Cl.$^2$ .............................................. C21C 5/52
[52] U.S. Cl. ......................................... 75/11; 75/30; 75/257
[58] Field of Search ................... 423/490; 75/11–13, 75/30, 257, 53–58

[56] References Cited

U.S. PATENT DOCUMENTS

| 1,794,401 | 3/1931 | Haglund | 75/11 |
| 2,036,760 | 4/1936 | Knox, Jr. | 423/309 |
| 3,294,486 | 12/1966 | Cremer | 423/309 X |

FOREIGN PATENT DOCUMENTS

| 947,068 | 1/1964 | United Kingdom | 423/490 |

OTHER PUBLICATIONS

Slack; A. V., Phosphoric Acid, vol. 1, Part II, 1968, Marcel Dekker Inc., NY, pp. 769 & 770.

*Primary Examiner*—M. J. Andrews
*Attorney, Agent, or Firm*—William S. Brown; Donald A. Gardiner

[57] ABSTRACT

A calcium fluoride-containing composition for use in conditioning electric furnace steelmaking slags is prepared from by-product scrubber solutions derived from wet-acid processing of phosphate rock by reacting the scrubber solution with calcium hydroxide.

2 Claims, No Drawings

SYNTHETIC FLUORSPAR FOR CONDITIONING ELECTRIC FURNACE SLAGS

This is a continuation of application Ser. No. 729,750, filed Oct. 5, 1976, now abandoned.

Natural fluorspar, $CaF_2$, has conventionally been used in electric furnace steelmaking to (1) promote bath fluidity, (2) increase reaction kinetics, (3) promote solution of lime by preventing formation of calcium silicates for optimum desulfurization and dephosphorization of the metal, (4) lower the liquidus temperature of basic slags and (5) maintain the desired slag basicity. However, natural metallurgical grade fluorspar is in limited supply domestically, and its cost has greatly increased in recent years.

Several methods have been suggested for the use of slags or slag conditioners other than flurospar. These include use of slags containing high levels of silica or magnesia, use of ilmenite ($FeTiO_3$), use of colemanite ($Ca_2B_6O_{11} \cdot 5H_2O$), use of olivine $(Mg,Fe)_2SiO_4$ and use of calcium ferrites. Other fluxes containing iron oxide, alumina, fluorspar and dolomite have also been suggested as slag additives. However, all of these techniques involve the use of primary raw materials, and most require greater quantities of lime additions to compensate for relatively high silica levels.

Large quantities of by-product fluosilicic acid, $H_2SiF_6$, generated during processing of phosphate rock into fertilizers, are conventionally neutralized and discarded because of phosphate contamination or lack of market. Processing of the impure $H_2SiF_6$ into fluoride products acceptable to the various metals industries is expensive and, at the present time, is not done to any great extent.

It has now been found, however, in accordance with the process of the invention, that a $CaF_2$-containing product suitable for slag conditioning during electric furnace steelmaking operations can be produced from $P_2O_5$-contaminated $H_2SiF_6$, such as that described above, in one simple neutralization operation in which the contaminated fluosilicic acid is reacted with calcium hydroxide.

Typically, the $P_2O_5$-contaminated fluosilicic acid is a dilute aqueous solution containing about 10 to 100 grams per liter of $H_2SiF_6$ and about 5 to 30 grams per liter of $P_2O_5$. This solution is heated to about 50° to 90° C and held at this temperature for the duration of the reaction. Powdered calcium hydroxide is added, with stirring or other suitable agitation of the reaction mixture, until the pH of the reaction mixture becomes about 7 to 9. This will generally require about 18 to 180 grams of calcium hydroxide per liter of the fluosilicic acid solution. The reaction is generally complete in a period of about 10 to 60 minutes, and the resulting precipitate is separated by conventional means such as filtration or decantation. It is then dried, preferably at a temperature of about 100° C, and bagged for subsequent utilization in conditioning slgas employed in electric furnace steelmaking. Composition of this product will vary considerably depending on the specific composition of the initial fluosilicic acid solution, amount of calcium hydroxide employed, temperature and time of reaction, etc., but generally the product will contain about 54 to 97 weight percent of $CaF_2$, about 0.1 to 11 weight percent of silica and about 0.5 to 11 weight percent of $P_2O_5$.

As discussed above, applicants have found that natural fluorspar may be replaced in steelmaking processes by the calcium fluoride-containing composition prepared by the process of the invention, and that, in particular, the addition of this composition significantly lowers slag viscosities with no adverse effect on furnace operations or quality of the product steel.

The invention will be more specifically illustrated by the following example.

EXAMPLE

A synthetic $CaF_2$-containing composition was prepared from a scrubber solution from wet-acid processing of phosphate rock. The scrubber solution consisted of an aqueous solution of $H_2SiF_6$, $Ca(H_2PO_4)_2$ and $H_3PO_4$ and contained aout 85 grams per liter of $H_2SiF_6$ and 28 grams per liter of $P_2O_5$. 50 liters of this solution was heated to 65° C and 8800 grams of powdered $Ca(OH)_2$ was added slowly and with vigorous stirring to provide a slurry having a pH of 9. The temperature was maintained, and the slurry stirred, for a period of 60 minutes, after which the resulting precipitate was separated by filtration and dried at 100° C for a period of 12 hours.

The resulting composition, containing 54.4 weight percent $CaF_2$, 10.6 weight percent silica and 11.2 weight percent $P_2O_5$, was then employed as a slag conditioner in a steelmaking process according to the following test procedure: 1431 pounds of scrap iron, containing approximately 99.3 weight percent iron, 0.23 weight percent carbon, 0.30 weight percent silicon, 0.010 weight percent sulfur, 0.018 weight percent phosphorus, 0.053 weight percent copper, andd 0.06 weight percent manganese, was melted in a nominal 1-ton electric arc furnace under 41 pounds of a slag consisting of 25 pounds of pebble lime and 16 pounds of quartz and having a nominal basicity of 1.5. After completion of the meltdown, this slag was removed and 58 pounds of a more viscous slag consisting of 39 pounds of pebble lime and 19 pounds of quartz and having a nominal basicity of 2.25 was added to the bath. After this slag was molten, metal and slag samples were taken, the bath was filmed, and 16.0 pounds of the above-prepared $CaF_2$ composition was added to the bath as conditioner.

The conditioner remained in the bath for a period of 47 minutes. At approximately 15 minute intervals the bath was filmed to qualitatively evaluate viscosity, and metal and slag samples were taken for analysis. It was found that the slag viscosity was substantially reduced by addition of the conditioner, and the furnace continued to operate normally. At the conclusion of the test the metal product was found to contain 0.007 weight percent phosphorus, 0.03 weight percent carbon, 0.008 weight percent sulfur, <0.01 weight percent silicon and <0.1 weight percent manganese.

Metallurgical grade fluorspar, containing 82 weight percent $CaF_2$ and 8.0 weight percent silica, was then used as a slag conditioner in the above-described test procedure in place of the synthetic $CaF_2$-containing composition prepared as above according to the process of the invention. The metal product contained 0.011 weight percent phosphorus, 0.04 weight percent carbon, 0.016 weight percent sulfur, 0.04 weight percent silicon and <0.05 weight percent manganese. It is thus apparent that the use of the synthetic $CaF_2$-containing composition of the invention resulted in no substantial degradation of the metal product, and that in particular the phosphorus content of the product was not increased.

We claim:

1. In an electric furnace steelmaking process employing a slag conditioner to lower the viscosity of the molten slag, the improvement comprising employing as the slag conditioner a composition prepared by reacting an aqueous scrubber solution from wet-acid processing of phosphate rock, said scrubber solution containing about 1 to 10 percent of fluosilicic acid and about 0.05 to 3 percent phosphoric acid, with about 18 to 180 grams of calcium hydroxide per liter of scrubber solution at a temperature of about 50° to 90° C and a pH of about 7 to 9.

2. The process of claim 1 in which the slag consists essentially of a combination of pebble lime and quartz.

* * * * *